US012687303B2

(12) United States Patent
Kapsaskis

(10) Patent No.: US 12,687,303 B2
(45) Date of Patent: Jul. 21, 2026

(54) RV STOVE TOP COVER

(71) Applicant: SBC Holdings LLC, South Bend, IN (US)

(72) Inventor: Christopher Kapsaskis, Colts Neck, NJ (US)

(73) Assignee: SBC Holdings LLC, South Bend, IN (US)

( * ) Notice: Subject to any disclaimer, the term of this patent is extended or adjusted under 35 U.S.C. 154(b) by 255 days.

(21) Appl. No.: 18/450,598

(22) Filed: Aug. 16, 2023

(65) Prior Publication Data

US 2025/0060108 A1     Feb. 20, 2025

(51) Int. Cl.
*F24C 15/12* (2006.01)
*B60P 3/36* (2006.01)
(52) U.S. Cl.
CPC ............... *F24C 15/12* (2013.01); *B60P 3/36* (2013.01)
(58) Field of Classification Search
CPC ............. F24C 15/12; F24C 3/085; B60N 3/16
USPC ........ 126/211, 214 R, 25 R, 39 E, 39 R, 215
See application file for complete search history.

(56) References Cited

U.S. PATENT DOCUMENTS

| | | | | | |
|---|---|---|---|---|---|
| 345,545 | A | * | 7/1886 | Ringen | .................. F24C 15/12 126/332 |
| 4,361,250 | A | * | 11/1982 | Foster | ................ B65D 47/0847 220/837 |
| 2010/0319742 | A1 | * | 12/2010 | Prusmack | ............ B62D 63/062 135/88.13 |

* cited by examiner

*Primary Examiner* — Vivek K Shirsat
(74) *Attorney, Agent, or Firm* — FLYNN THIEL, P.C.

(57) ABSTRACT

A recreational vehicle comprising a movable body having at least one wheel for moving the recreational vehicle. The movable body includes a kitchen area having a stove. The stove includes a stove top surface. A removable stove top cover is secured to and covers the stove top surface. The removable stove top cover includes rear engagement means for engaging with a rear portion of the stove. The removable stove top cover further includes front engagement means for engaging with a front portion of the stove. The rear engagement means and the front engagement means cooperate to secure the removable stove top cover on the stove. The removable stove top cover can be completely separated from the stove.

21 Claims, 6 Drawing Sheets

RV STOVE TOP COVER

FIELD OF THE INVENTION

The present invention relates to a stove for a recreational vehicle, and in particular to a stove top cover for a stove of a recreational vehicle.

BACKGROUND OF THE INVENTION

Recreational vehicles can have kitchens therein. A recreational vehicle is a motor vehicle or trailer that includes living quarters designed for accommodation. Types of recreational vehicles include motorhomes, campervans, coaches, caravans (also known as travel trailers and camper trailers), fifth-wheel trailers, popup campers, and truck campers. This list is not exhaustive. Recreational vehicles can include a kitchen that has a stove.

SUMMARY OF THE INVENTION

The present invention, according to one aspect, is directed to a recreational vehicle comprising a movable body having at least one wheel for moving the recreational vehicle, with the movable body including a kitchen area having a stove; the stove including a stove top surface; and a removable stove top cover secured to and covering the stove top surface. The removable stove top cover includes rear engagement means for engaging with a rear portion of the stove. The removable stove top cover further includes front engagement means for engaging with a front portion of the stove. The rear engagement means and the front engagement means cooperate to secure the removable stove top cover on the stove. The removable stove top cover can be completely separated from the stove.

Another aspect of the present invention is to provide a stove assembly for a recreational vehicle. The stove assembly comprises a stove having a stove top surface and a removable stove top cover secured to and covering the stove top surface. The removable stove top cover includes rear engagement means for engaging with a rear portion of the stove. The removable stove top cover further includes front engagement means for engaging with a front portion of the stove. The rear engagement means and the front engagement means cooperate to secure the removable stove top cover on the stove. The removable stove top cover can be completely separated from the stove.

According to yet another aspect of the present invention, a removable stove top cover for covering a top of a stove in a recreational vehicle is provided. The removable stove top cover comprises a flat surface and a front lip. The flat surface has flat projections extending from the flat surface and configured to be inserted into corresponding slots in the stove. The front lip has downwardly depending pins extending from a bottom of the front lip and configured to be inserted into an upwardly facing opening in the stove. The projections extend in a first direction and the pins extend in a second direction, the first direction and the second direction being perpendicular. The projections and the pins cooperate to secure the removable stove top cover on the stove. The removable stove top cover can be completely separated from the stove.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
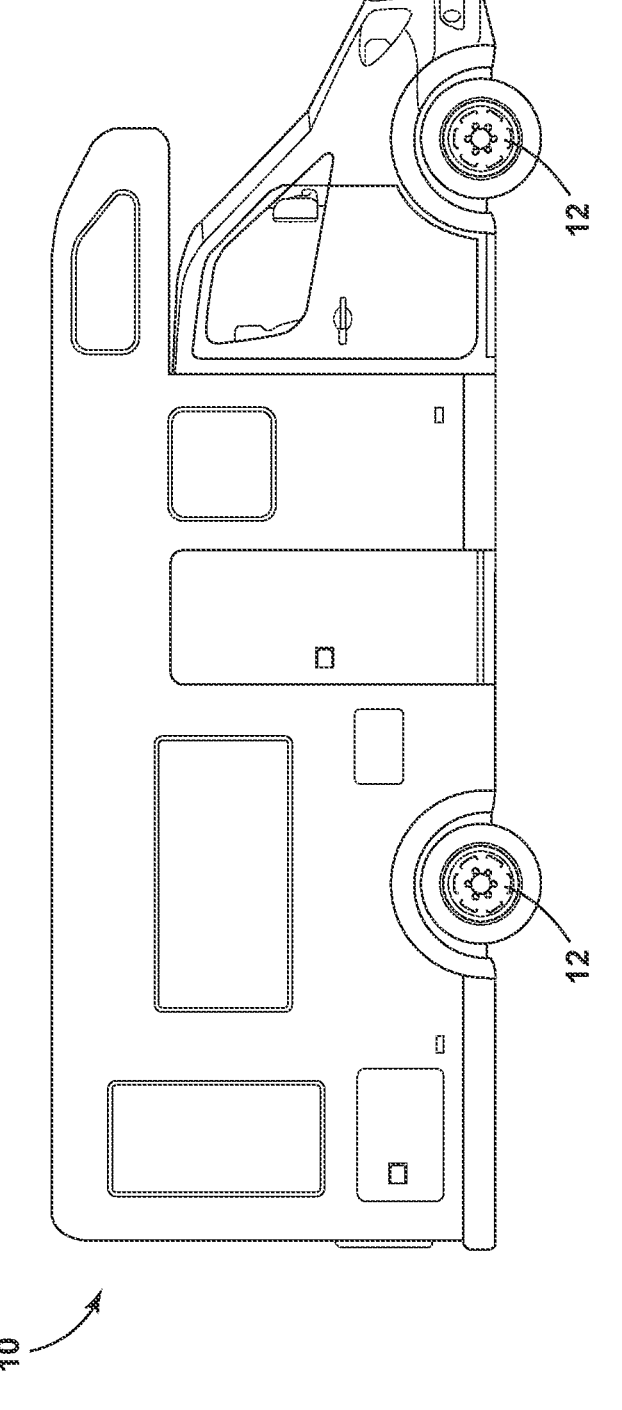
FIG. 1 is a side schematic view of an example recreational vehicle.
Figure 2:
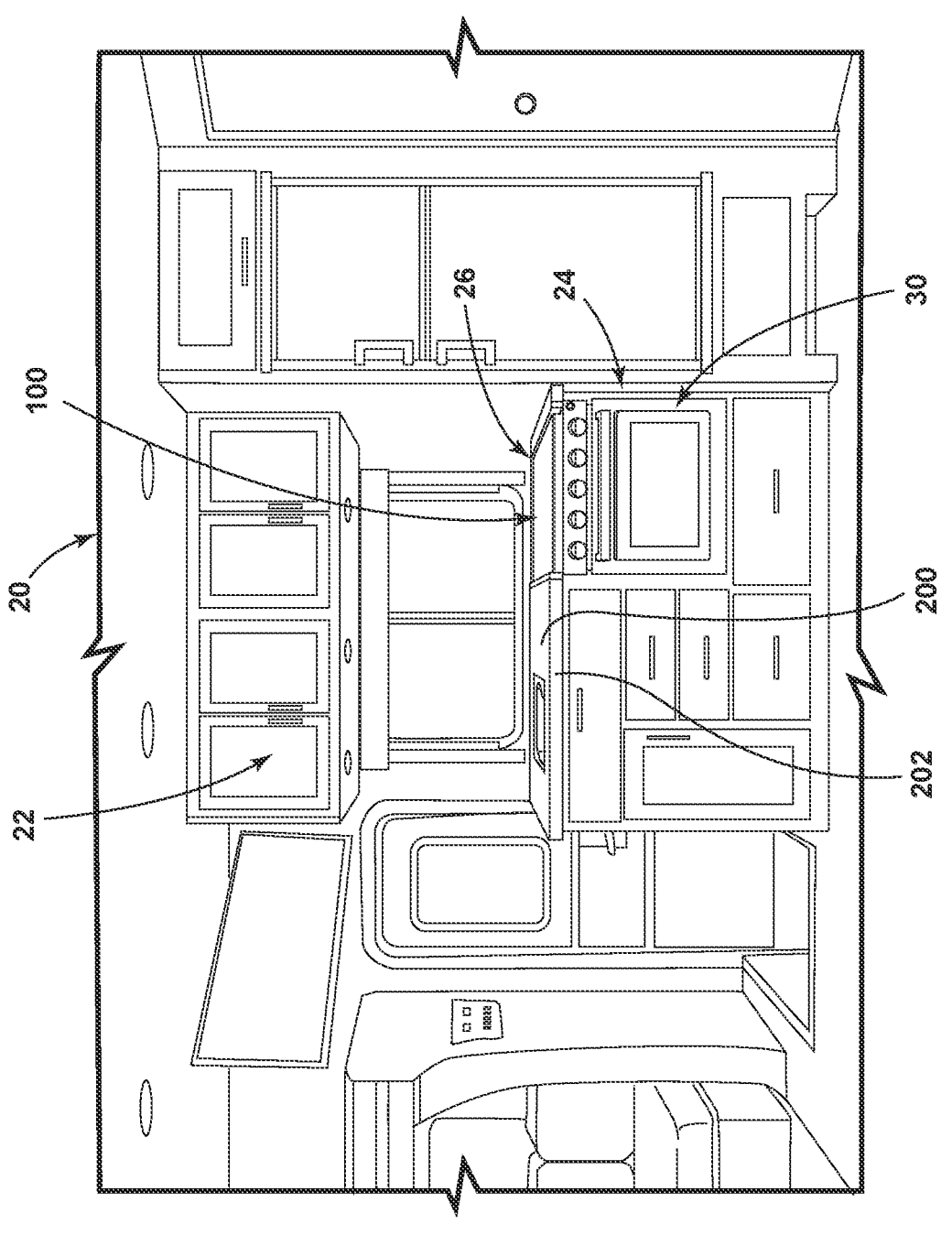
FIG. 2 is an interior view of the recreational vehicle, with the recreational vehicle including a kitchen having a stove.

The reference number 10 (FIG. 1) generally designates a recreational vehicle. The recreational vehicle 10 is a motor vehicle or trailer that includes living quarters designed for accommodation. Types of recreational vehicles 10 include motorhomes, campervans, coaches, caravans (also known as travel trailers and camper trailers), fifth-wheel trailers, popup campers, and truck campers. This list is not exhaustive. The example of the recreational vehicle 10 as shown in FIG. 1 is a motorhome that is self-propelled via wheels 12 (with at least some of the wheels 12 being driven to move the motorhome). However, the recreational vehicle 10 could be pulled by a vehicle or could be connected to a vehicle (e.g., in a bed of a truck). An interior 20 of the illustrated recreational vehicle 10 is shown in FIG. 2. The interior 20 can include a kitchen 22 that has a stove 24. The stove 24 includes a stove top 26 with at least one, and typically several, burner areas 28 (see FIG. 3). Each of the burner areas 28 includes a burner assembly 50 that is configured to supply heat to an item positioned above the burner assembly 50, with the item typically placed on a grate positioned over the stove top 26. The stove 24 can also include an oven 30.

Figures 3, 4:
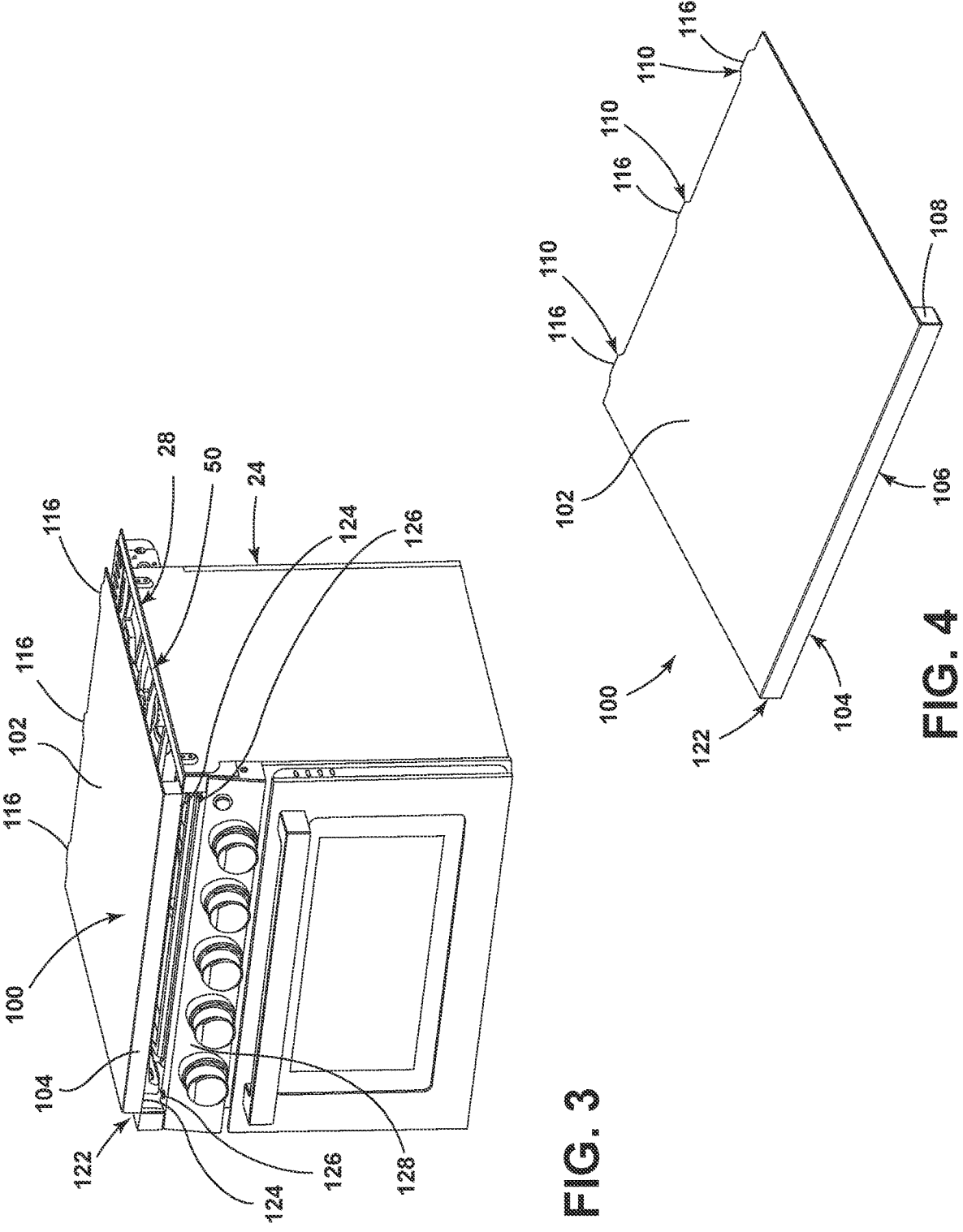
FIG. 3 is a perspective view of the stove and a stove top cover according to an embodiment of the present invention.
FIG. 4 is a perspective view of the stove top cover according to an embodiment of the present invention.

FIG. 2 illustrates a stove top cover 100 covering the stove top 26 of the stove 24. The stove top cover 100 is configured to cover the stove top 26 to provide for additional counter space and to encase at least a portion of the burner areas 28. The stove top cover 100 (see FIG. 4) includes a top plate 102 and a front lip 104. It is contemplated that the top plate 102 and the front lip 104 could be separate but connected elements or integral elements. Furthermore, the top plate 102 and the front lip 104 could be made of any material. As shown in FIG. 4, the stope top cover 100 is formed from a rectangular sheet of stainless steel that is bent at an end to form a tube 106 with a rectangular cross-section, with the tube 106 forming the front lip 104. It is contemplated that an interior 108 of the front lip 104 could be hollow or could have a material therein (e.g., a tube of plastic surrounded by the bent sheet of metal).

In the illustrated example, the stove top cover 100 includes features for securing the stove top cover 100 over the stove top 26 of the stove 24. The embodiment of the stove top cover 100 as shown in FIG. 2 includes front engagement elements 112 and rear engagement elements 110. It is contemplated that the stove top cover 100 could include further engagement elements for securing the stove top cover 100 to the stove 26. It is further contemplated that the front engagement elements 112 and the rear engagement elements 110 could work together in securing the stove top cover 100 over the stove top 26.

Figure 5:
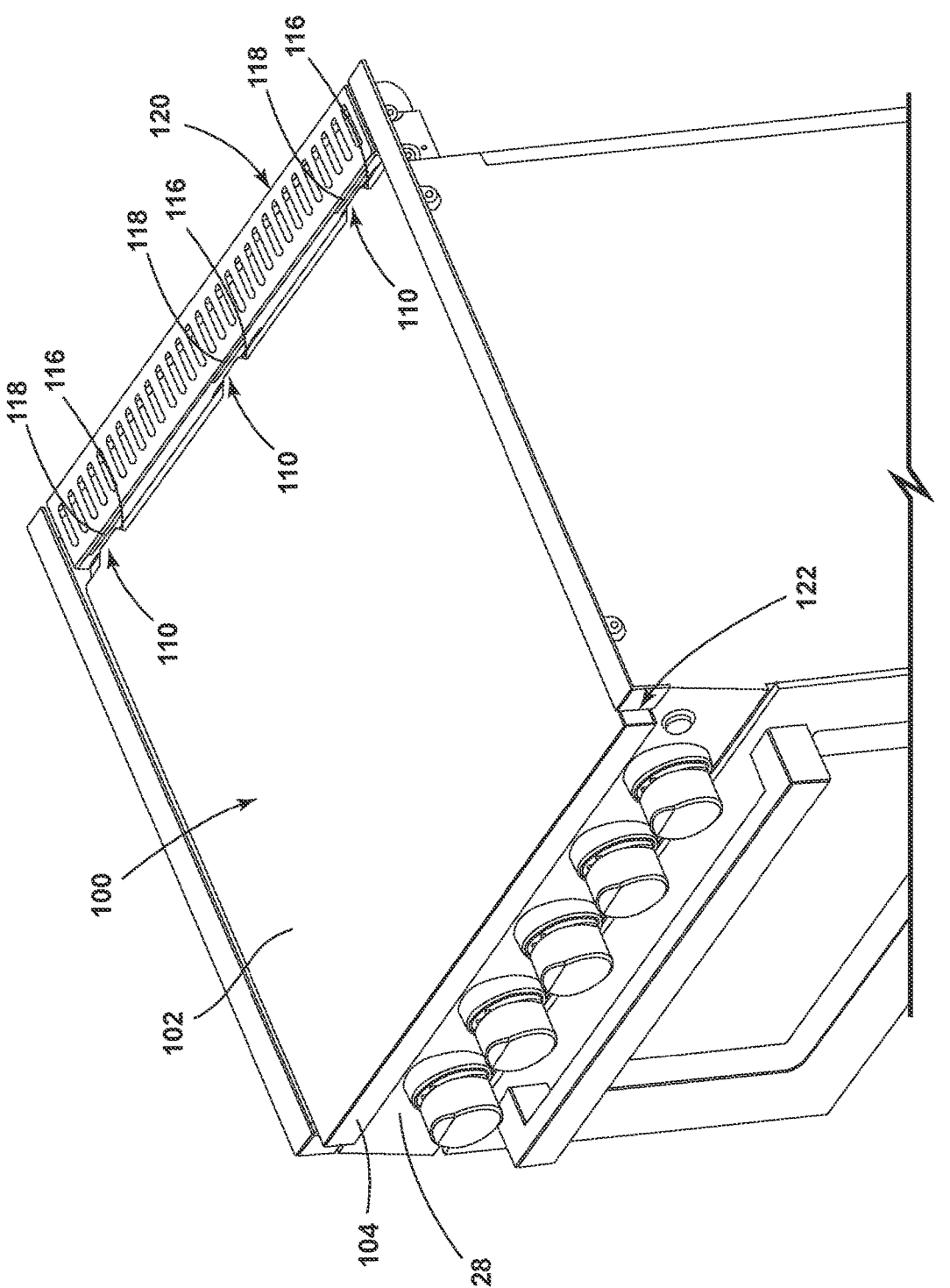
FIG. 5 is an exploded top perspective view of the stove and the stove top cover according to an embodiment of the present invention.
Figures 6, 7:
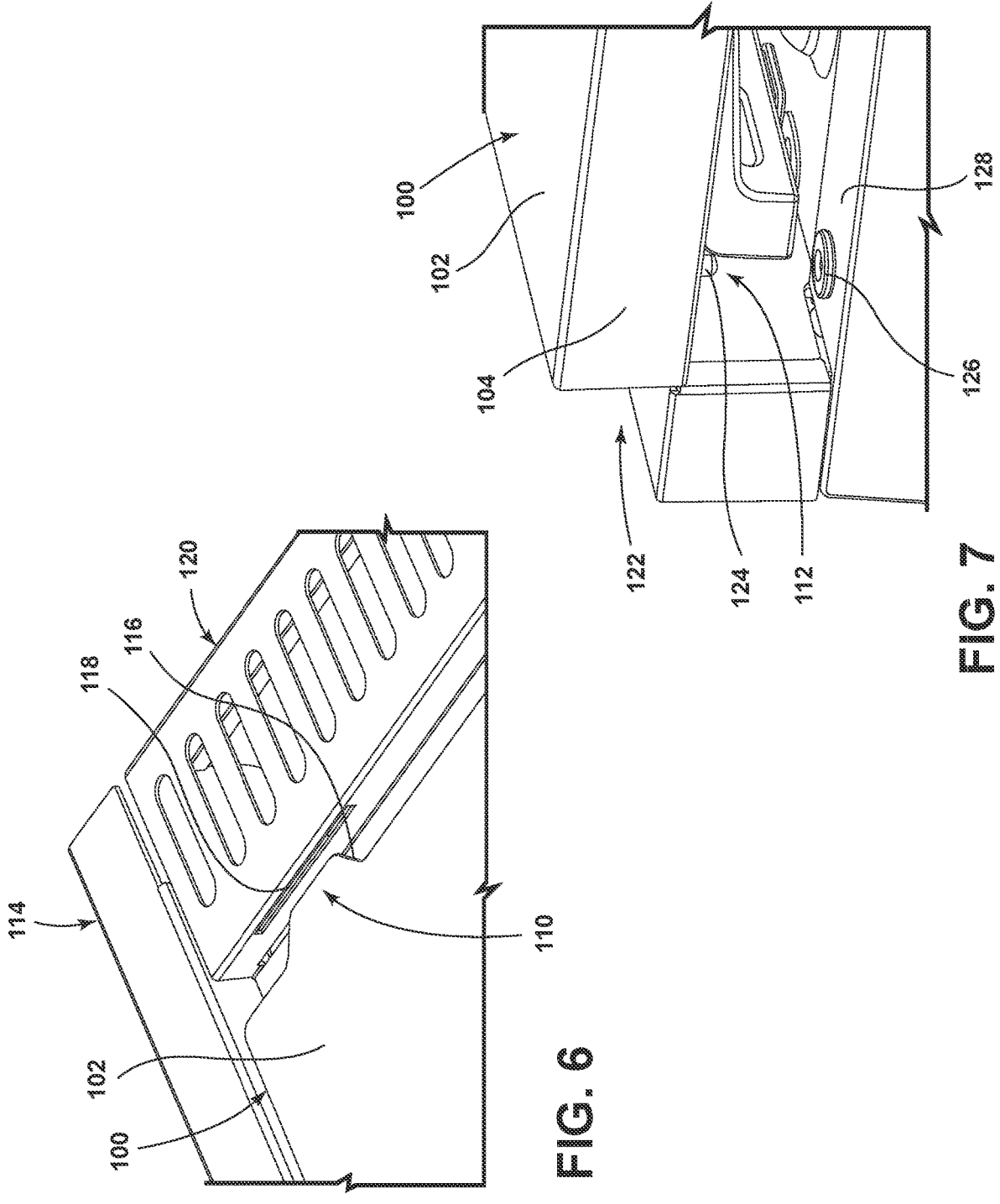
FIG. 6 is a close up exploded top perspective view of a rear portion of the stove and the stove top cover according to an embodiment of the present invention.
FIG. 7 is a close up exploded top perspective view of a front portion of the stove and the stove top cover according to an embodiment of the present invention.

The illustrated rear engagement elements 110 of the stove top cover 100 help to secure a rear portion 114 of the stove top cover 100 to the stove 24. As shown in FIGS. 4-6, the stove top cover 100 can include a plurality of projections 116. The projections 116 can be tabs integral with the top plate 102 of the stove top cover 100 as shown. Alternatively, the projections 116 could be separate elements connected to the top plate 102. The illustrated embodiment includes projections 116 that are received within corresponding slots 118 in a grate 120 located at a rear of the stove top 26 of the stove 24. While three projections 116 are shown because the grate 120 of the stove top 26 includes three slots 118, it is contemplated that any number of projections 116 could be used, including a number less than the number of slots 118. Further rear engagement elements 110 that are contemplated include magnets, clips, hook and loop type fasteners, or other engagement elements.

The illustrated front engagement elements 112 of the stove top cover 100 help to secure a front portion 122 of the stove top cover 100 including the front lip 104 to the stove 24. As shown in FIG. 7, the front lip 104 of the stove top cover 100 can include a plurality of downwardly projecting pins 124. The illustrated embodiment includes pins 124 that are received within corresponding openings 126 in a front plate 128 of the stove top 26 located at a front of the stove 24. While two pins 124 are contemplated because the front plate 128 of the stove top 26 includes two opening 126 (one adjacent each side of the stove 24), it is contemplated that any number of pins 124 and openings 126 could be used. Further front engagement elements 112 that are contemplated include magnets, clips, hook and loop type fasteners, or other engagement elements.

Figures 8, 9:
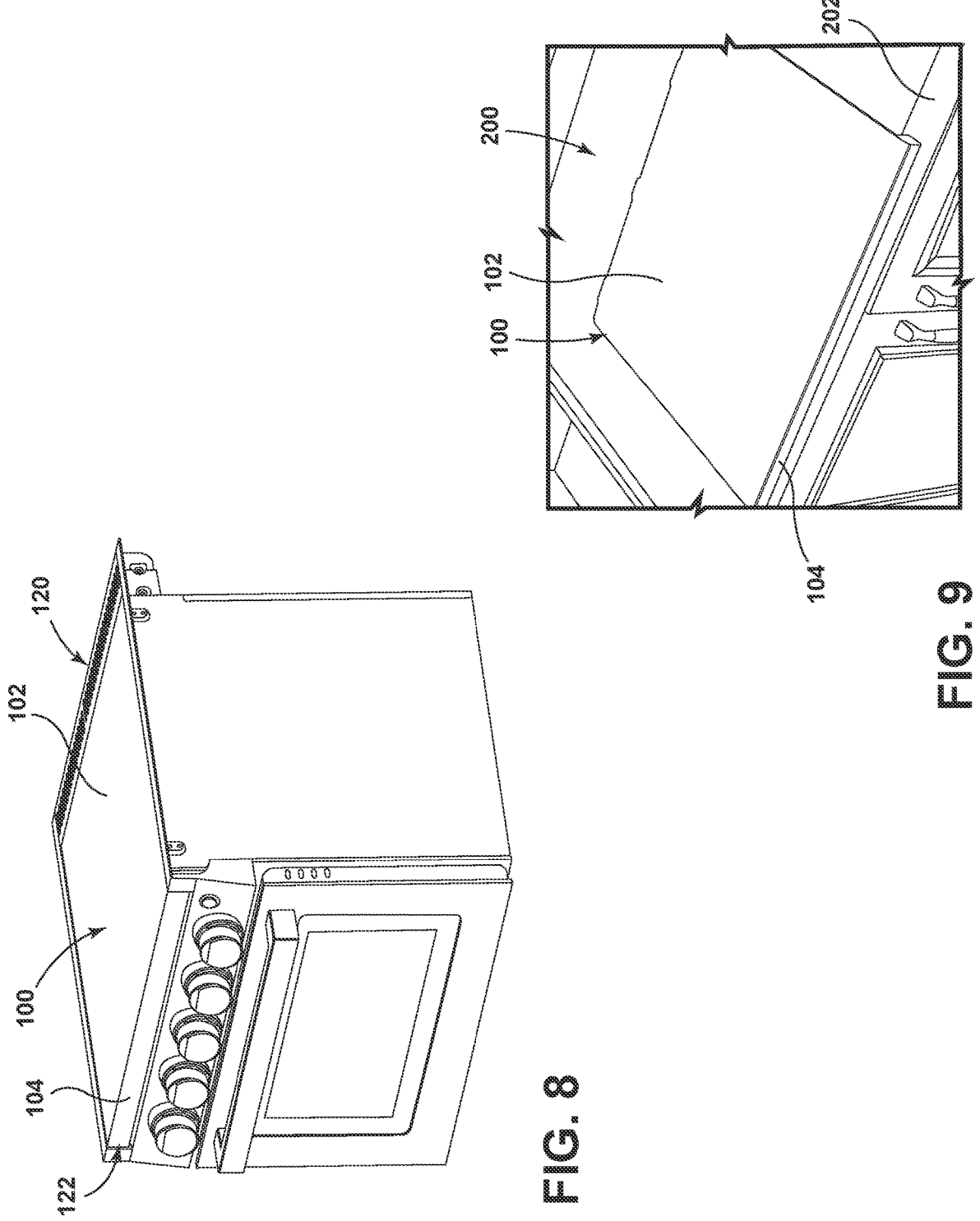
FIG. 8 is a top perspective view of the stove and the stove top cover according to an embodiment of the present invention.
FIG. 9 is a top perspective view of the stove top cover according to an embodiment of the present invention being used on a counter.

FIGS. 3 and 5-7 illustrate the method for securing the stove top cover 100 to the stove 24. First, the stove top cover 100 is positioned over the stove top 26 of the stove 24 as shown in FIGS. 3 and 5. The projections 116 of the top plate 102 of the stove top cover 100 are then slid into the corresponding slots 118 in the grate 120 located at the rear of the stove top 26 of the stove 24 as shown in FIGS. 5 and 6. Finally, the stove top cover 100 is rotated downward to insert the pins 124 into the corresponding openings 126 in the front plate 128 of the stove top 26 located at the front of the stove 24 as shown in FIG. 7. The stove top cover 100 is then secured to the stove 24 as illustrated in FIG. 8.

The illustrated stove top cover 100 can be used as a cutting board. For example, the stove top cover 100 can be used as a cutting board while secured to the stove 24 as illustrated in FIG. 8. Alternatively, the stove top cover 100 can be used as a cutting board when placed on a counter 200 in the kitchen 22. When the stove top cover 100 is used as a cutting board when placed on a counter 200 in the kitchen 22, the front lip 104 can be positioned against a front surface 202 of the counter 200 as shown in FIG. 9 to limit movement of the stove top cover 100 during use.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A recreational vehicle comprising:
a movable body having at least one wheel for moving the recreational vehicle;
the movable body including a kitchen area having a stove;
the stove including a stove top surface; and
a removable stove top cover secured to and covering the stove top surface;
the removable stove top cover including rear engagement means for engaging with a rear portion of the stove; and
the removable stove top cover further including front securing means for engaging with a front portion of the stove;
the rear engagement means and the front securing means cooperating to secure the removable stove top cover on the stove;
wherein the removable stove top cover can be completely separated from the stove.

2. The recreational vehicle of claim 1, wherein:
the removable stove top cover comprises a flat surface and a front lip;
the flat surface having the rear engagement means at a rear area thereof; and
the front lip having the front securing means at a front area thereof.

3. The recreational vehicle of claim 2, wherein:
the rear engagement means comprise flat projections extending from the flat surface and configured to be inserted into corresponding slots in the stove.

4. The recreational vehicle of claim 3, wherein:
the front securing means comprise downwardly depending pins extending from a bottom of the front lip and configured to be inserted into an upwardly facing opening in the stove.

5. The recreational vehicle of claim 4, wherein:
the projections extend in a first direction and the pins extend in a second direction, the first direction and the second direction being perpendicular.

6. The recreational vehicle of claim 2, wherein:
the front securing means comprise downwardly depending pins configured to be inserted into an upwardly facing opening in the stove.

7. The recreational vehicle of claim 1, wherein:
the rear means comprise flat projections extending from a rear area of the removable stove top cover and configured to be inserted into corresponding slots in the stove.

8. The recreational vehicle of claim 7, wherein:

the front securing means comprise downwardly depending pins extending from a bottom of a front area of the removable stove top cover and configured to be inserted into an upwardly facing opening in the stove.

9. The recreational vehicle of claim 8, wherein:

the projections extend in a first direction and the pins extend in a second direction, the first direction and the second direction being perpendicular.

10. The recreational vehicle of claim 1, wherein:

the front securing means comprise downwardly depending pins extending from a bottom of a front area of the removable stove top cover and configured to be inserted into an upwardly facing opening in the stove.

11. A stove assembly for a recreational vehicle, the stove assembly comprising:

a stove having a stove top surface; and a removable stove top cover secured to and covering the stove top surface;

the removable stove top cover including rear means for engaging with a rear portion of the stove; and the removable stove top cover further including front securing means for engaging with a front portion of the stove;

the rear means and the front securing means cooperating to secure the removable stove top cover on the stove;

wherein the removable stove top cover can be completely separated from the stove.

12. The stove assembly of claim 11, wherein:

the removable stove top cover comprises a flat surface and a front lip;

the flat surface having the rear means at a rear area thereof; and the front lip having the front securing means at a front area thereof.

13. The stove assembly of claim 12, wherein:

the rear means comprise flat projections extending from the flat surface and configured to be inserted into corresponding slots in the stove.

14. The stove assembly of claim 13, wherein:

the front securing means comprise downwardly depending pins extending from a bottom of the front lip and configured to be inserted into an upwardly facing opening in the stove.

15. The stove assembly of claim 14, wherein:

the projections extend in a first direction and the pins extend in a second direction, the first direction and the second direction being perpendicular.

16. The stove assembly of claim 12, wherein:

the front securing means comprise downwardly depending pins configured to be inserted into an upwardly facing opening in the stove.

17. The stove assembly of claim 11, wherein:

the rear means comprise flat projections extending from a rear area of the removable stove top cover and configured to be inserted into corresponding slots in the stove.

18. The stove assembly of claim 17, wherein:

the front securing means comprise downwardly depending pins extending from a bottom of a front area of the removable stove top cover and configured to be inserted into an upwardly facing opening in the stove.

19. The stove assembly of claim 18, wherein:

the projections extend in a first direction and the pins extend in a second direction, the first direction and the second direction being perpendicular.

20. The stove assembly of claim 11, wherein:

the front securing means comprise downwardly depending pins extending from a bottom of a front area of the removable stove top cover and configured to be inserted into an upwardly facing opening in the stove.

21. A removable stove top cover for covering a top of a stove in a recreational vehicle, the removable stove top cover comprising:

a flat surface and a front lip;

the flat surface having flat projections extending from the flat surface and configured to be inserted into corresponding slots in the stove; and the front lip having downwardly depending pins extending from a bottom of the front lip and configured to be inserted into an upwardly facing opening in the stove;

wherein the projections extend in a first direction and the pins extend in a second direction, the first direction and the second direction being perpendicular;

the projections and the pins cooperating to secure the removable stove top cover on the stove;

wherein the removable stove top cover can be completely separated from the stove.

* * * * *